July 10, 1923.  1,461,247
G. LINGENFELTER
ORCHARD HEATER
Filed Dec. 17, 1920  2 Sheets-Sheet 1
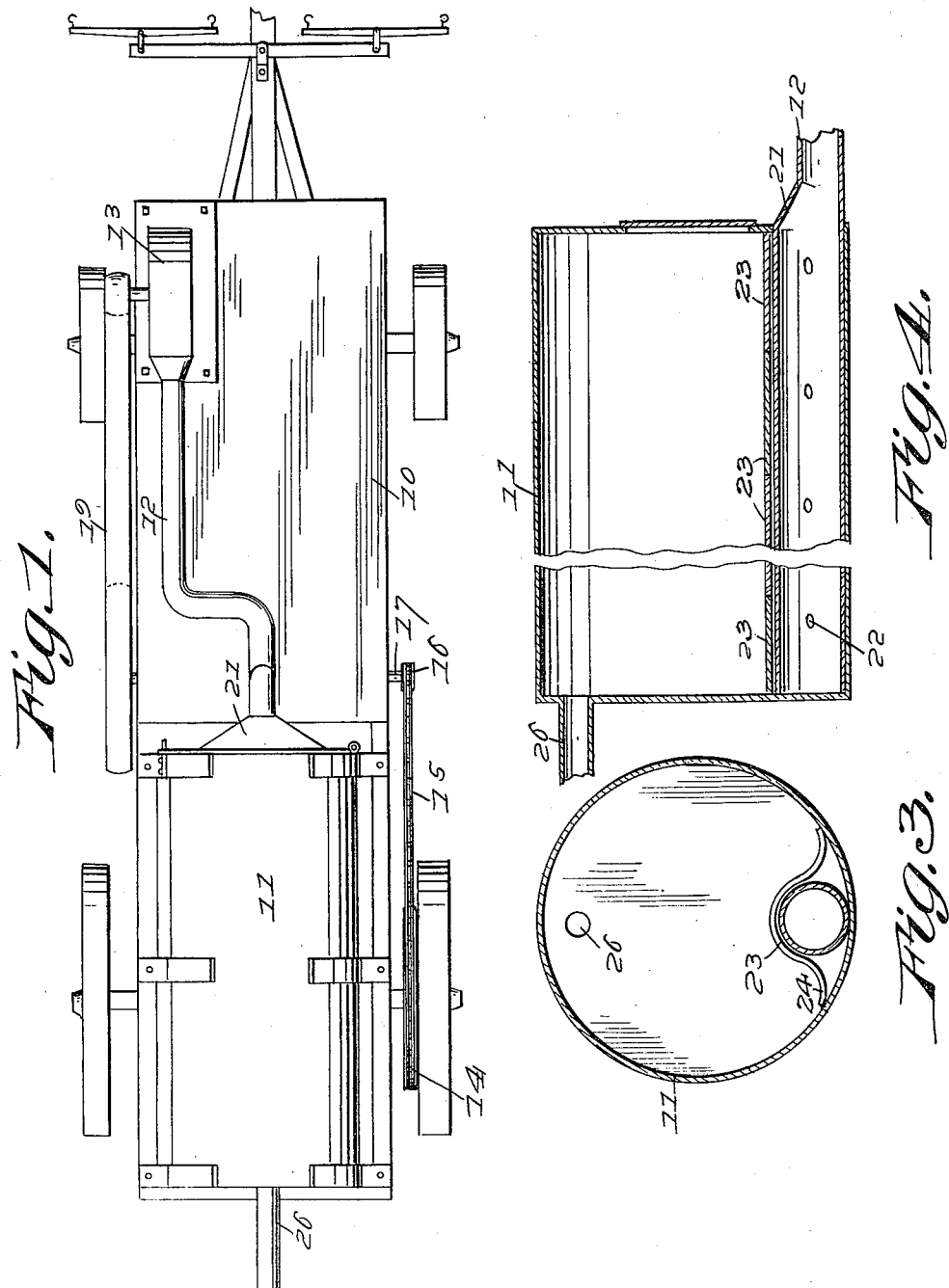

July 10, 1923.
G. LINGENFELTER
ORCHARD HEATER
Filed Dec. 17, 1920
1,461,247
2 Sheets-Sheet 2
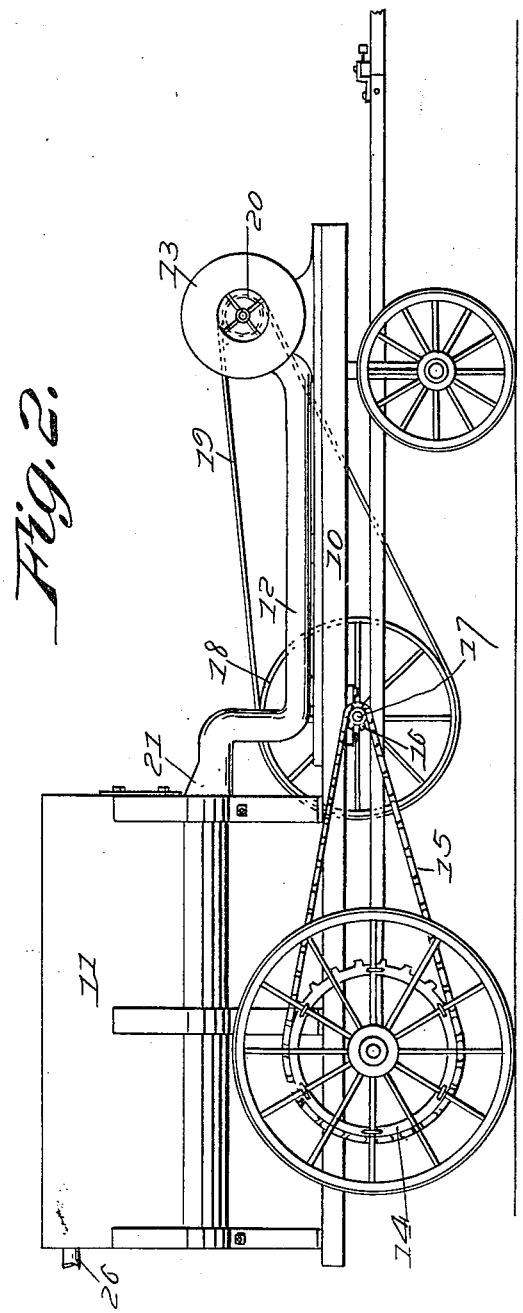
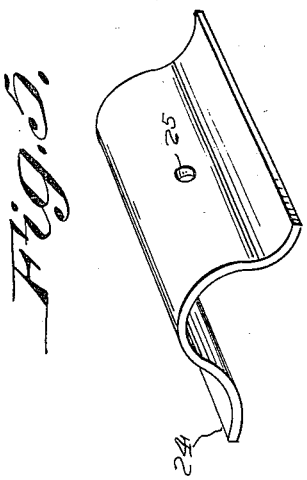
Inventor
George Lingenfelter
By G. Hume Talbert
Attorney Patented July 10, 1923.

1,461,247

UNITED STATES PATENT OFFICE.

GEORGE LINGENFELTER, OF SANDY, OREGON.

ORCHARD HEATER.

Application filed December 17, 1920. Serial No. 431,385.

*To all whom it may concern:*

Be it known that I, GEORGE LINGENFELTER, a citizen of the United States of America, residing at Sandy, in the county of Clackamas and State of Oregon, have invented new and useful Improvements in Orchard Heaters, of which the following is a specification.

The object of the invention is to provide simple and efficient means whereby orchards in exposed positions geographically or in the event of unseasonable weather may be heated, or wherein the temperature may be modified to an extent sufficient to protect the trees, as for example in the budding stage, under conditions which will be more favorably effective than when reliance is placed upon bond fires and the like; and more particularly to provide an apparatus of a portable character which is adapted for producing and widely distributing heated air under conditions which will raise the temperature of the surrounding atmosphere without involving risk of damage to the foliage or buds of the fruit bearing trees which are the object of protection; and with these aims in view the invention consists in a construction and combination of parts of which a preferred embodiment is shown in the drawings, wherein:

Figure 1 is a plan view of a heating apparatus embodying the invention.

Figure 2 is a side view of the same.

Figure 3 is a transverse sectional view of the furnace.

Figure 4 is a longitudinal sectional view of the same.

Figure 5 is a detail view of one of the plates.

The apparatus consists essentially of a wheeled truck which may be connected to any suitable traction means to provide for moving it from place to place as the requirements may dictate, a platform 10 being arranged upon said truck to support a substantially cylindrical furnace 11 with which communicates a blast pipe 12 served by a fan 13. The fan may operate by any suitable motive power but inasmuch as the efficiency of the apparatus depends to a certain extent upon moving it from place to place and more or less continuously throughout the area of the orchard, it is practical to drive the fan from one of the wheels of the truck as by providing the same with a sprocket wheel 14 connected by a suitable chain 15 with a sprocket pinion 16 on a transverse shaft 17 carrying a pulley 18, and connecting the latter by means of a belt 19 with a pulley 20 on the fan shaft.

The blast pipe is preferably enlarged or expanded as shown at 21 and extended longitudinally through the furnace casing 11 near or at the bottom thereof as shown in Figures 3 and 4, said enlarged or expanded portion of the pipe being provided with lateral perforations 22 to produce an effective distribution of the air supplied by the fan.

Spanning the portion of the blast pipe which is enclosed within the furnace is a series of plates 23 of arched form as shown in detail in Figure 5, the outturned edge portions 24 thereof being arranged in bearing contact with the inner surface of the wall of the furnace, and the arches of the plates being provided in their sides with the outlets 25 so that the blast from the fan is discharged circumferentially within the furnace of which the fuel may consist of straw, leaves or other like material which will burn freely and produce a relatively high temperature. The outlet from the furnace which is shown at 26 is preferably located at the rear end thereof and near the top, and owing to the blast furnished by the fan the heat is widely distributed and thus serves to effect the temperature of the air throughout a relatively large zone.

Having described the invention, what is claimed as new and useful is:—

1. An orchard heating apparatus having a horizontal furnace provided at one end and near the top with an outlet, a blast pipe extending longitudinally through the furnace near the bottom thereof, arched plates spanning the enclosed portion of the blast pipe and having lateral distributing openings, and means for supplying a blast to said pipe.

2. An orchard heating apparatus having a horizontal furnace provided at one end and near the top with an outlet, a blast pipe extending longitudinally through the furnace near the bottom thereof, arched plates spanning the enclosed portion of the blast pipe and having lateral distributing openings and means for supplying a blast to said pipe, said plates being provided with outwardly turned flanges for bearing contact with the inner surface of the wall of the furnace.

In testimony whereof he affixes his signature.

GEORGE LINGENFELTER.